United States Patent
Liu et al.

(10) Patent No.: US 10,877,770 B2
(45) Date of Patent: Dec. 29, 2020

(54) COMPUTING DEVICE

(71) Applicant: Shanghai Zhaoxin Semiconductor Co., Ltd., Shanghai (CN)

(72) Inventors: Jinglong Liu, Beijing (CN); Yankui Niu, Beijing (CN); Shuai Yuan, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 220 days.

(21) Appl. No.: 16/150,289

(22) Filed: Oct. 3, 2018

(65) Prior Publication Data

US 2019/0370011 A1 Dec. 5, 2019

(30) Foreign Application Priority Data

Jun. 1, 2018 (CN) .......................... 2018 1 0558334

(51) Int. Cl.
*G06F 9/4401* (2018.01)
*G06F 9/445* (2018.01)
*G06F 9/30* (2018.01)

(52) U.S. Cl.
CPC ........ *G06F 9/4411* (2013.01); *G06F 9/30098* (2013.01); *G06F 9/44505* (2013.01)

(58) Field of Classification Search
CPC ........................... G06F 9/4411; G06F 9/30098
See application file for complete search history.

(56) References Cited

U.S. PATENT DOCUMENTS

| | | | |
|---|---|---|---|
| 2002/0023237 A1* | 2/2002 | Yamada ................ | G06F 1/3209 713/323 |
| 2007/0234031 A1* | 10/2007 | Garney ................. | G06F 9/4401 713/2 |
| 2013/0013905 A1* | 1/2013 | Held ..................... | G06F 21/575 713/2 |
| 2014/0095854 A1* | 4/2014 | Chen ..................... | G06F 9/4401 713/1 |
| 2015/0220134 A1* | 8/2015 | Zhou .................... | H05K 7/1498 713/320 |
| 2016/0253244 A1* | 9/2016 | Zhang .................. | G06F 11/1464 707/645 |
| 2017/0063641 A1* | 3/2017 | Su ........................ | G06F 11/2284 |
| 2017/0255567 A1* | 9/2017 | Vidyadhara .......... | G06F 13/1668 |
| 2019/0004818 A1* | 1/2019 | Wu ....................... | G06F 1/3287 |

* cited by examiner

*Primary Examiner* — Phil K Nguyen
(74) *Attorney, Agent, or Firm* — JCIPRNET (57) ABSTRACT

A computing device is provided. The computing device includes a storage medium and a processor. The storage medium stores a configuration file for configuring a specific type of hardware within the computing device. The processor is coupled to the storage medium. The processor loads a basic input output system (BIOS), performs a first interface function to read and analyze the configuration file during an operating process of the BIOS, and configures a first register of a first specific type hardware within the computing device based on a result of the analyzing performed by the first interface function on the configuration file.

18 Claims, 3 Drawing Sheets

=====configure the MSR in the first configuration phase=====
Core:00    msr:1203    AndMask:FFFFFFFFFFFFFFFF    OrMask:00000400    Value:100000418
=====configure the MSR in the second configuration phase=====
Core:03    msr:1203    AndMask:FFFFFFFFFFFFFFFF    OrMask:00000400    Value:00000418
Core:02    msr:1203    AndMask:FFFFFFFFFFFFFFFF    OrMask:00000400    Value:00000418
Core:01    msr:1203    AndMask:FFFFFFFFFFFFFFFF    OrMask:00000400    Value:00000418
Core:00    msr:1203    AndMask:FFFFFFFFFFFFFFFF    OrMask:00000400    Value:100000418
=====configure the MSR in the third configuration phase=====
Core:00    msr:1203    AndMask:FFFFFFFFFFFFFBFF    OrMask:00000000    Value:100000018
Core:02    msr:1203    AndMask:FFFFFFFFFFFFFBFF    OrMask:00000000    Value:00000018
=====configure the MSR in the fourth configuration phase=====
Core:00    msr:1203    AndMask:FFFFFFFFFFFFFBFF    OrMask:00000000    Value:100000018
Core:01    msr:1203    AndMask:FFFFFFFFFFFFFBFF    OrMask:00000000    Value:00000018
Core:02    msr:1203    AndMask:FFFFFFFFFFFFFBFF    OrMask:00000000    Value:00000018
Core:03    msr:1203    AndMask:FFFFFFFFFFFFFBFF    OrMask:00000000    Value:00000018
=====configure the MSR in the fifth configuration phase=====
Core:00    msr:1203    AndMask:FFFFFFFFFFFFFFFF    OrMask:00000004    Value:1000000lC
Core:01    msr:1203    AndMask:FFFFFFFFFFFFFFFF    OrMask:00000004    Value:0000001C
Core:02    msr:1203    AndMask:FFFFFFFFFFFFFFFF    OrMask:00000004    Value:0000001C
Core:03    msr:1203    AndMask:FFFFFFFFFFFFFFFF    OrMask:00000004    Value:0000001C
Core:03    msr:1203    AndMask:FFFFFFFFFFFFFFFF    OrMask:00000004    Value:0000001C
Core:01    msr:1203    AndMask:FFFFFFFFFFFFFFFF    OrMask:00000004    Value:0000001C
Core:00    msr:1203    AndMask:FFFFFFFFFFFFFFFF    OrMask:00000004    Value:1000000lC

FIG. 3

COMPUTING DEVICE

CROSS-REFERENCE TO RELATED APPLICATION

This application claims the priority benefit of China application serial no. 201810558334.9, filed on Jun. 1, 2018. The entirety of the above-mentioned patent application is hereby incorporated by reference herein and made a part of this specification.

BACKGROUND

Technical Field

The disclosure relates to a computing device, and particularly relates to a computing device that may be interrupted and execute interface functions to configure registers during the running process of the BIOS.

Description of Related Art

With the revolution of the central processing unit (CPU) and other computer hardware devices, the deficiencies of the traditional basic input output system (BIOS) have gradually been exposed, such as low developing efficiency, poor performance, poor functional expandability, slow upgrades, poor security, lack of support for booting from hard disks' addresses over 2 TB, etc. These deficiencies of the traditional BIOS have gradually hindered the development of the computer system. Accordingly, Unified Extensible Firmware Interface (UEFI) BIOS was proposed to compensate for the deficiencies of the traditional BIOS mainly because of the following advantages of the UEFI BIOS system: higher development efficiency, more expandability, better performance and higher security.

However, during the UEFI BIOS-related developing tasks (such as debugging), if it is determined that the UEFI BIOS needs to be modified, developers would need to recompile and relaunch the UEFI BIOS after finishing the modification. Then, if the UEFI BIOS needs to be modified again, the foregoing procedure of recompiling and relaunching also must be repeated. As a result, not only the work efficiency will be reduced, but the R&D cycle is also prolonged along with increased costs.

Therefore, for those skilled in the art, how to design a mechanism that may improve the efficiency is indeed an important issue.

SUMMARY

For the purpose of improving flexibility of the UEFI BIOS and utilizing its efficiency during configuring the registers of the computing device, this disclosure provides a computing device that includes a storage medium and a processor. The storage medium stores a configuration file, and at least one hardware of specific type within the computing device is configured according to the configuration file. The processor is coupled to the storage medium, and is configured to load a basic input output system, execute a first interface function to read and analyze the configuration file during the running process of the basic input output system, and configure a first register of a first hardware of specific type within the computing device according to the result of the analyzing performed by the first interface function on the configuration file. Through the configuration file and the interface function provided by the disclosure, the update of hardware configuration (such as the CPU, the chipset, and the external controller) of the computing device is achieved, thereby improving the flexibility of the UEFI BIOS (that is, the hardware configuration may be modified during the executing of the BIOS) while utilizing its efficiency of configuring the registers of the computing device. As a result, not only the work efficiency is improved, but also the R&D cycle is shortened along with reduced costs.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a serial port log prompt outputted by the BIOS according to an embodiment of the disclosure.

DESCRIPTION OF THE EMBODIMENTS

In brief, the disclosure proposes a computing device, whose processor may access a configuration file stored at a specific location in a storage medium via a specially designed interface function during the running process of the UEFI BIOS, and adjust the configuration of certain hardware within the computing device according to the content of the configuration file. In this way, if there is a need to reconfigure certain hardware within the computing device, the reconfiguration may be achieved simply by modifying the configuration file in the storage medium without going through such processes as modifying, compiling and launching the UFEI BIOS. For example, the effect of reconfiguring certain hardware within the computing device may be achieved simply by modifying the content of the configuration file. Accordingly, flexibility of the UEFI BIOS may be improved, efficiency of R&D may be enhanced, and the R&D cycle may be shortened.

Figure 1:
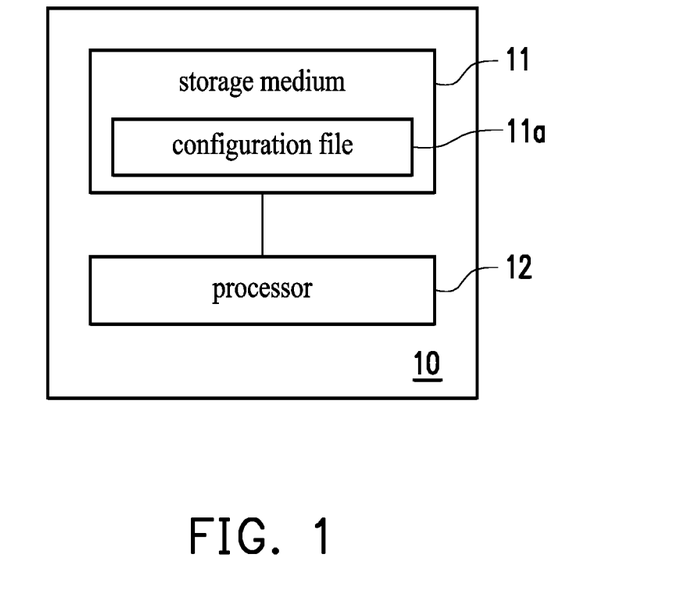
FIG. 1 is a schematic view of a computing device according to an embodiment of the disclosure.

With reference to FIG. 1, FIG. 1 is a schematic view of a computing device according to an embodiment of the disclosure. In one embodiment, a computing device 10 includes a storage medium 11 and a processor 12. In different embodiments, the computing device 10 may be a smart phone, a personal computer (PC), a notebook PC, a netbook PC, a tablet PC, a television, a portable device, or a portable multimedia player, for example.

The storage medium 11 may be a serial peripheral interface read-only memory (SPI ROM), a NAND flash memory chip, a USB flash disk, or a hard disk. The processor 12 is coupled to the storage medium 11 and may be a CPU or another similar processor, but is not limited thereto.

In this embodiment of the disclosure, the storage medium 11 is used to store a configuration file 11a for configuring at least one specific type of hardware within the computing device 10. The specific type of hardware includes but is not limited to the processor 12, a chipset (not shown), a peripheral device controller interface (not shown) and so on. The processor 12 may execute BIOS (such as UEFI BIOS), execute a first interface function to read and analyze the configuration file 11a during the running process of the BIOS, and configure a first register of a first specific type hardware within the computing device 10 according to a result of the analyzing performed by the first interface function on the configuration file 11a. Several embodiments are provided below to specifically illustrate the spirit of this disclosure.

For the purpose of facilitating illustration, the UEFI BIOS is taken as an example, but embodiments of the disclosure are not limited thereto.

The running process of the UEFI BIOS approximately includes four phases: a security boot phase (SEC phase), a pre-extensible firmware interface initialization phase (PEI phase), a driver execution phase (DXE phase), and a boot device selection phase (BDS phase). In the foregoing phases, the SEC phase is the earliest boot phase of the machine and needs a very short period of time. In the PEI phase, the CPU operates in a 32-bit protected mode, boots and initializes a memory controller, and completes some of the most basic hardware chip initializations. In the DXE phase, the operation mode of the CPU switches to the long mode of a 64-bit protected mode, and the BIOS loads all the hardware chip drivers and completes initialization operations of all the hardware. In the BDS phase, an operating system (OS) is booted according to a preset boot sequence of the BIOS.

In one embodiment of the disclosure, while performing a first phase among the foregoing phases, the processor 12 interrupts a running step in the first phase, starts to execute the first interface function to read and analyze the configuration file 11a, and configures the first register of the first specific type hardware within the computing device 10 according to the result of the analyzing performed by the first interface function on the configuration file 11a. Then, after completing configuring the first register, the processor 12 may resume the remaining steps of the first phase.

Specifically, the developer may set a checkpoint in the UEFI BIOS according to their requirements, so that the processor 12, executing to the checkpoint, interrupts the first phase and starts to execute the first interface function.

The first interface function may be implemented in different manners in different embodiments. For example, if the first phase under consideration is the PEI phase, the first interface function may be a PEI module to PEI module interface (PPI) (according to relevant UEFI BIOS specifications, the PPI only corresponds to the PEI phase). In another embodiment, if the first phase under consideration is the DXE phase or the BDS phase, the first interface function may be "Protocol" as defined in the UEFI BIOS specifications (according to relevant UEFI BIOS specifications, "Protocol" only corresponds to the DXE phase and the BDS phase).

In other words, through codes of the first interface function, the processor 12, executing the first interface function, may find the configuration file 11a at a specified location in the storage medium 11, and may analyze the content of the configuration file 11a and then configure the targeted hardware correctly (e.g., the first register) according to the analyzing result.

In another embodiment, the processor 12 may also execute the first interface function to read the configuration file 11a after the first phase is completed and configure the first register accordingly. Then, after the first register is configured, the processor 12 may proceed to the second phase. In other words, the checkpoint may be set between the first phase (e.g., the SEC phase) and the second phase (e.g., the PEI phase) that are consecutive, so that the processor 12 may execute the first interface function in the configuration phase where the checkpoint exists. However, the disclosure is not limited thereto.

Besides, in other embodiments, the processor 12, after the first interface function is executed to complete configuring the first register, may further execute a second interface function to read and analyze the configuration file 11a during the remaining process of the UEFI BIOS, and configure a second register of a second specific type hardware within the computing device 10 according to the result of the analyzing performed by the second interface function on the configuration file 11a.

For example, if the first register and the second register are respectively a model-specific register (MSR) in the processor 12 (e.g., CPU) and a register within a chipset, then the processor 12, for example, may execute the first interface function (e.g., "PPI") and the second interface function (e.g., "Protocol") at different checkpoints in the PEI phase and the DXE phase respectively to read the configuration file 11a from the storage medium 11, thereby configure the first register and the second register in the configuration phases where the checkpoints exist. However, the disclosure is not limited thereto. For example, in addition to the model-specific register (MSR), the first register may also be a hard disk register. In addition to the register within the chipset (such as a register within a graphic processing unit (GPU)), the second register may also be a register within a computer peripheral device controller, such as a USB controller register.

In one embodiment, the configuration file 11a may be stored in a plurality of specific areas disposed on the storage medium 11, and the plurality of specific areas may respectively correspond to the configuration phases in which the processor 12 executes the interface function, and may be used to store data strings. The data strings may include configuration information (such as address information, mask values, etc.) of the targeted register. Accordingly, the processor 12, executing the interface function in different configuration phases, may find the targeted data string in the corresponding specific area, analyze the data string, and then configure the targeted register according to the configuration information obtained from the analyzing operation. Further explanation is provided in the following with reference to FIG. 2.

Figure 2:
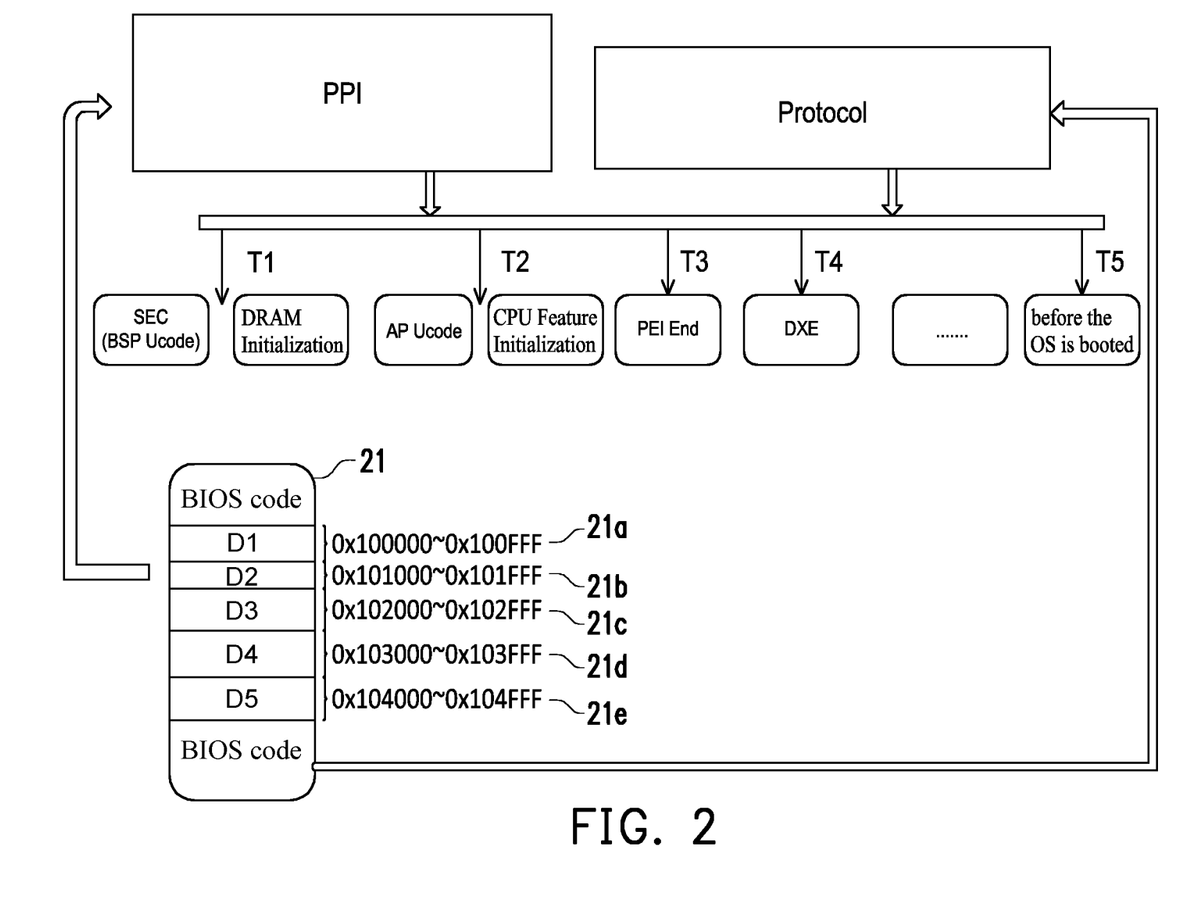
FIG. 2 is a schematic view of accessing a configuration file to configure registers in different configuration phases during the running process of a UEFI BIOS according to an embodiment of the disclosure.

With reference to FIG. 2, FIG. 2 is a schematic view of accessing a configuration file to configure a register in different configuration phases during the running process of a UEFI BIOS according to an embodiment of the disclosure.

As shown in FIG. 2, the running process of the UEFI BIOS includes a plurality of more specific phases. In this embodiment, the checkpoints are configured at time points corresponding to configuration phases T1, T2, T3, T4 and T5, so that a processor 12 may read data strings D1-D5 from a configuration file 11a in a storage medium 21 by executing an interface function (e.g., PPI or Protocol) in the configuration phases T1, T2, T3, T4 and T5 respectively. In FIG. 2, the configuration phase T1 is located after a boot-strap processor (BSP) loads a patch, the configuration phase T2 is located before the processor 12 sets CPU features, the configuration phase T3 is located after the processor 12 sets the CPU features, the configuration phase T4 is located in the DXE phase, and the configuration phase T5 is located before the OS is booted.

In FIG. 2, the storage medium 21 includes specific areas 21a, 21b, 21c, 21d and 21e. The sizes of the each specific areas 21a, 21b, 21c, 21d and 21e may be set to 4K bytes, but the disclosure is not limited thereto. In this embodiment, the address of the specific area 21a located in the storage medium 21 may be 0x100000~0x100FFF, the address of the specific area 21b located in the storage medium 21 may be 0x101000~0x101FFF, the address of the specific area 21c located in the storage medium 21 may be 0x102000~0x102FFF, the address of the specific area 21d located in the storage medium 21 may be 0x103000~0x103FFF, and the address of the specific area 21e located in the storage medium 21 may be 0x104000~0x104FFF. However, the disclosure is not limited thereto. In some embodiments, the specific area may be any free area in the storage medium 21. For example, the address of the specific area 21a may be composed of three pieces of discontinuous address segments.

The specific areas 21a, 21b, 21c, 21d and 21e may correspond to the configuration phases T1, T2, T3, T4 and T5 respectively, and may be used to store different data strings D1, D2, D3, D4 and D5 respectively. The data strings D1, D2, D3, D4 and D5 may cooperatively form a configuration file, and each of data strings D1, D2, D3, D4 and D5 may include a plurality of configuration information (such as address information, mask values, etc.) of a targeted register. In the embodiment of FIG. 2, for example, the storage medium 21 is a serial peripheral interface read-only memory (SPI ROM). That is, the data strings D1, D2, D3, D4 and D5 cooperatively form the configuration file 11a as shown in FIG. 1, and are stored in the same storage medium 21 with the BIOS code. However, the disclosure is not limited thereto, and the configuration file 11a may also be stored in a NAND flash memory chip, a USB flash disk, or a hard disk.

More specifically, when the processor 12 executes a first interface function (e.g., PPI) in the configuration phase T1, the first interface function may read the configuration file correspondingly, and access the specific area 21a corresponding to the configuration phase T1 to obtain the data string D1, thereby analyze the data string D1 to obtain the configuration information therein. For the purpose of facilitating illustration, it is assumed that the targeted registers in the embodiment of FIG. 2 are all MSRs, but implementations of the disclosure are not limited thereto.

The configuration information of each MSR includes: MSR address, occupying 4 bytes; a core mask, occupying 4 bytes; NAND mask and OR mask for filling in values to be set for the MSR, occupying 8 bytes each; a setting sequence, tag bits, and reserved bits (byte-aligned and added to increase configuration efficiency), occupying 8 bytes. Accordingly, a total of 32 bytes are required to configure one MSR, so the specific area (e.g., 21a, 21b, 21c, 21d, or 21e) may be used to configure 128 (i.e., 4K/32) MSRs.

More specifically, the uses of the 32 bytes required to configure one MSR are as follows: (1) bytes 0-3: MSR address; (2) bytes 4-7: a core mask for indicating which core in the processor 12 needs to be set, wherein a bit k corresponds to a k-th core (k may be an integer in a range of 0 to 31), and the bit k as 1 indicates that the k-th core needs to be set and the bit k as 0 indicates that the k-th core does not need to be set; (3) byte 8: indicating a setting sequence, wherein the bit 0 as 1 indicates that the core is set sequentially from the 0th core, the bit 0 as 0 indicates that the core is set in a reverse order from the last core, and the bits 1 to 7 are reserved bits; (4) bytes 9-15: reserved bytes; (5) bytes 16-23: NAND mask; (6) bytes 24-31: OR mask. Herein the NAND mask and the OR mask are used for filling in values to be set by the MSR.

For example, suppose that the MSR located at address 1440 within the 0th core within the processor 12 is to be configured to 080001028h, the corresponding configuration information may then be represented as: (1) bytes 0-3: 00001440h (i.e., the MSR address); (2) bytes 4-7: 00000001h (i.e., configuring the 0th core); (3) bytes 8-15: FFFFFFFF (default); (4) bytes 16-23: FFFFFFFFFFFFFFFF; (6) bytes 24-31: 0000000080001028. In this case, when the processor 12 obtains the foregoing configuration information from the data string by executing the first interface function (e.g., PPI) in the configuration phase T1, the processor 12 may configure the MSR located at address 1440 within the 0th core to 080001028h correspondingly.

For another example, suppose that the bit 25 of the MSR located at address 1023 within all the cores of the processor 12 is to be set to 1 and the bit 26 is cleared to 0, then the corresponding configuration information may be represented as: (1) bytes 0-3: 00001023h (i.e., the MSR address); (2) bytes 4-7: FFFFFFFFh (i.e., all the cores); (3) bytes 8-15: FFFFFFFF (default); (4) bytes 16-23: Mask=Lshift64(3, 25) (indicating shifting the binary value of 3 (i.e., 11) to the left by 25 bits, that is, setting both the bit 25 and the bit 26 to be 1); (6) bytes 24-31: Data=Lshift64(1, 25) (indicating shifting the binary value of 1 to the left by 25 bits and executing an OR calculation with Mask to write the bit 25 of MSR as 1 and clear the bit 26 to 0). In this case, when the processor 12 analyzes the data string to obtain the foregoing configuration information by executing the first interface function (e.g., PPI) in the configuration phase T1, the processor 12 may correspondingly set the bit 25 of the MSR located at address 1023 within all the cores to 1, and clear the bit 26 to 0.

With reference to FIG. 2 again, after the processor 12 has configured the MSR in the configuration phase T1 by executing the first interface function (e.g., PPI), the processor 12 may execute a second interface function (e.g., PPI) in the configuration phase T2. The second interface function may access the specific area 21b correspondingly, corresponding to the configuration phase T2, to obtain and analyze the data string D2, thereby configuring the targeted MSR according to the configuration information obtained by analyzing the data string D2. In one embodiment, the configuration file is a binary file that can be directly executed by a computer, and correspondingly the data string is also a binary file.

Similarly, the processor 12 may execute a third interface function (e.g., PPI) in the configuration phase T3, and the third interface function may access the specific area 21c, corresponding to the configuration phase T3, to obtain and analyze the data string D3, thereby configure the targeted MSR according to the configuration information obtained by analyzing the data string D3. Afterwards, the processor 12 may execute a fourth interface function (e.g., Protocol) in the configuration phase T4, and the fourth interface function may access the specific area 21d, corresponding to the configuration phase T4, to obtain and analyze the data string D4, thereby configure the targeted MSR according to the configuration information obtained by analyzing the data string D4. Then, the processor 12 may execute a fifth interface function (e.g., Protocol) in the configuration phase T5, and the fifth interface function may access the specific area 21e, corresponding to the configuration phase T5, to obtain and analyze the data string D5, thereby configuring the targeted MSR according to the configuration information obtained by analyzing the data string D5.

In other embodiments, in addition to the MSR, the processor 12 may also read and analyze the configuration file by executing an interface function in an appropriate configuration phase, and configure other types of registers or other hardware parameters accordingly, such as a microcode in the processor 12, an input/output (IO) space configuration of the chipset, a PCI configuration space setting, or a memory setting. Correspondingly, the configuration file may also include a data string describing how to configure the foregoing various types of components. The format of each configuration information in the data string may be specially designed so that the interface function, after analyzing the configuration information in the data string, may configure the targeted component correctly.

In one embodiment, when the storage medium 21 is a USB flash disk or a hard disk, a configuration file named "Config.cfg" may be created in the storage medium 21. The configuration file may be encrypted, and may be decrypted during the running process of the UEFI BIOS.

The configuration file may include one or more types of corresponding configuration information for configuring the microcode within the processor 12, the IO space configuration of the chipset, the PCI configuration space setting or the memory setting. Herein the formats of the various configuration information are exemplified as follows:

The configuration information regarding the MSR may include: (1) MSR address; (2) core mask; (3) setting sequence and reserved bits; (4) AND mask of values; (5) OR mask of values.

The configuration information of the IO space configuration of the chipset may include: (1) IO address; (2) byte width (1 byte, 2 bytes, or 4 bytes); (3) AND mask of values; (4) OR mask of values.

The configuration information of the memory setting may include: (1) memory address; (2) byte width (2 bytes, 4 bytes, or 8 bytes); (3) AND mask of values; (4) OR mask of values.

The configuration information of the PCI configuration space setting may include: (1) segment address; (2) bus number; (3) device number; (4) function number; (5) register; (6) bit width (1 byte, 2 bytes, or 4 bytes); (7) AND mask of values; (8) OR mask of values.

The configuration information of the microcode within the processor 12 may include the microcode content that need to be written.

In addition, besides the configuration information, the data string may also include phase start tags and phase end tags corresponding to different configuration phases, and type start tags and type end tags corresponding to different types of components. Herein the type start tag and the type end tag may be recorded between the phase start tag and the phase end tag, and the configuration information of the corresponding type of component may be recorded between the type start tag and the type end tag. Accordingly, when the interface function accesses the data string within the configuration file, through analyzing the foregoing contents of the data string, it is possible to know which type of component should be configured in which configuration phase.

In one embodiment, the data string may be represented as follows:

[first phase start tag]
   [first type start tag]
      (first configuration information)
   [first type end tag]
   [second type start tag]
      (second configuration information)
   [second type end tag]
[first phase end tag]
[second phase start tag]
   [first type start tag]
      (third configuration information)
   [first type end tag]
   [third type start tag]
      (fourth configuration information)
   [third type end tag]
[second phase end tag]
...

In the foregoing data string, it is assumed that the first phase start tag and the first phase end tag correspond to a first configuration phase, the first type start tag and the first type end tag correspond to a first type component (e.g., MSR), and the second type start tag and the second type end tag correspond to a second type component (e.g., IO space configuration). In this case, when the processor 12 executes the first interface function (e.g., PPI) in the first configuration phase, the first interface function may analyze the foregoing data string to know that it should configure the first type component and the second type component according to the first configuration information and the second configuration information respectively in the first configuration phase.

In addition, it is assumed that the second phase start tag and the second phase end tag correspond to a second configuration phase, and the third type start tag and the third type end tag correspond to a third type component (e.g., the PCI configuration space setting, the USB controller register, etc.). In this case, when the processor 12 executes the second interface function (e.g., Protocol) in the second configuration phase, the second interface function may analyze the foregoing data string to know that it should configure the first type component and the third type component according to the third configuration information and the fourth configuration information respectively in the second configuration phase. An example is provided below for more specific illustration.

In one embodiment, the data string in the configuration file may include the following content:

```
[PEI0]
    [MSR]
        //Configure the MSR at address 1440 within the 0th
        core to be 400
        [Item] 1440 1 0 FFFFFFFFFFFFFFFF 400
        //Configure the MSR at address 1440 within the 0th core
to the 3rd core to be 400, configure the 3rd core first, and configure
the 0th core last
        [Item] 1440 F 1 FFFFFFFFFFFFFFFF 400
    [MSR-END]
    [IO]
        //Write 80 into IO 80
        [Item] 80 b FF 80
        //Write 80 into IO 80 and IO 81
        [Item] 80 w FFFF 8080
        //Write 80 into IO 80, IO 81, IO 82 and IO 83
        [Item] 80 d FFFFFFFF 80808080
    [IO-END]
    [MEM]
        //Write 80 into the address 500000 of memory
        [Item] 500000 b FF 80
    [MEM-END]
    [PCI]
```

```
        //Write 0x40 into the configuration space of segment 0, bus 0,
device 5, function 0 and register 54
            [Item] 0 0 5 0 54 b FF 40
    [PCI-END]
    [MICRO]
            //Write the following microcode file into the CPU
            55 52 41 53 00 00 00 00 E2 07 17 01 B0 07 03 00
    [MICRO-END]
[PEI0-END]
[PEI1]
...
[PEI1-END]
```

In the foregoing data string, [PEI0] and [PEI1] are both phase start tags, and [PEI0-END] and [PEI1-END] are phase end tags corresponding to [PEI0] and [PEI1] respectively. [MSR], [IO], [MEM], [PCI] and [MICRO] are all hardware type start tags, and [MSR-END], [IO-END], [MEM-END], [PCI-END] and [MICRO-END] are hardware type end tags corresponding to [MSR], [IO], [MEM], [PCI] and [MICRO] respectively. Behind the symbol "[Item]" is the configuration information, and behind the symbol "II" is an explanation regarding the configuration information.

In the foregoing embodiment, it is assumed that [PEI0] and [PEI1] correspond to the first configuration phase and the second configuration phase respectively. When the processor 12 executes the first interface function in the first configuration phase to read the foregoing data string, the first interface function may then correspondingly configure the MSR, the microcode, the IO space configuration of the chipset, the PCI configuration space setting or the memory setting according to each configuration information recorded between [PEI0] and [PEI0-END] in the first configuration phase. Please refer to the description in the previous embodiment for the format definition of each configuration information in the foregoing data string.

For example, the first interface function may execute the following operations according to two pieces of configuration information recorded between [MSR] and [MSR-END]: (1) configure the MSR at address 1440 within the 0th core to be 400; (2) configure the MSR at address 1440 within the 0th core to the 3rd core to be 400, configure the 3rd core first, and configure the 0th core last.

For another example, the first interface function may also execute the following operations according to three pieces of configuration information recorded between [IO] and [IO-END]: (1) write 80 into IO 80; (2) write 80 into IO 80 and IO 81; (3) write 80 into IO 80, IO 81, IO 82 and IO 83.

In addition, the first interface function may also execute the following operations according to the configuration information recorded between [MEM] and [MEM-END], the configuration information recorded between [PCI] and [PCI-END], and the configuration recorded between [MICRO] and [MICRO-END] respectively: (1) write 80 into the address 500000 of memory; (2) write 0x40 into the configuration space of segment 0, bus 0, device 5, function 0 and register 54; and (3) write a microcode such as "55 52 41 53 00 00 00 00 E2 07 17 01 B0 07 03 00" into the CPU.

Afterwards, when the processor 12 executes the second interface function in the second configuration phase to read the foregoing data string, the second interface function may then correspondingly configure the MSR, the microcode, the IO space configuration of the chipset, the PCI configuration space setting or the memory setting according to each configuration information (not additionally provided) recorded between [PEI1] and [PEI1-END] in the second configuration phase.

A storage medium such as a USB flash disk or a hard disk is usually a file system such as a file allocation table (FAT) etc., and has a relatively larger storage space. A storage medium such as a SPI ROM, a Flash ROM or a NAND flash memory chip is usually not a FAT file, and has a relatively smaller storage space. In one embodiment, when the storage medium 21 is a SPI ROM or a NAND flash memory chip, since it may be impossible to analyze the foregoing configuration file at the beginning of the running process of the BIOS, an additional tool may be needed to convert the configuration file into a binary format.

In one embodiment, the configuration file stored in the storage medium 21, such as the SPI ROM and the NAND flash memory chip, may include the following: (1) bytes 0-5: configuration phase; (2) bytes 6-7: reserved; (3) bytes 8-15: configuration type; (4) bytes 16-N(N is a positive integer not less than 16): specific configuration information (32 bytes for each configuration information); (5) bytes N–(N+32): end tags. However, the disclosure is not limited thereto. In short, the more the configuration information, the larger the configuration file, and the greater the value of N.

In one embodiment, the processor 12 may control the BIOS to output a serial log prompt to check whether the targeted hardware (e.g., MSR) has been configured correctly.

With reference to FIG. 3, FIG. 3 is a serial port log prompt outputted by the BIOS according to an embodiment of the disclosure. In FIG. 3, "Core" denotes the core at which the configured MSR is located, "msr" denotes the configured MSR address, "AndMask" denotes the AndMask value required to be configured, "OrMask" denotes the OrMask value required to be configured, and "Value" denotes the value eventually written into the MSR. According to the content shown in FIG. 3, the related personnel may confirm whether the targeted MSR has been configured as needed through "Value".

In different embodiments, the processor 12 may load the BIOS when the computing device 10 is booted, and may also load the BIOS when the computing device 10 resumes from an S3 state. When the processor 12 loads the BIOS at booting, as mentioned in the previous embodiment, the executing of the BIOS sequentially goes through the SEC phase, the PEI phase, the DXE phase and the BDS phase, and then enters the OS. When the processor 12 resumes from the S3 state and loads the BIOS, the executing of the BIOS only needs to go through the SEC phase and the PEI phase before enters the OS. However, the processor 12, according to the previous embodiment, may still read the configuration file by executing the interface function during certain configuration phases in the SEC phase so as to configure the targeted hardware.

Specifically, when the computing device 10 resumes from the S3 state, certain registers within the processor 12 or the chipset may be lost (for example, the configuration previously implemented at booting may be lost). Accordingly, if it is possible to configure the designated register by executing the interface function when the computing device 10 resumes from the S3 state, the probability for the computing device 10 to be down may then be reduced. From another point of view, this mechanism may be viewed as a patch mechanism.

In one embodiment, the processor 12 may access the NAND flash memory chip, the USB flash disk and hard disk only after completing the SEC phase. Accordingly, if the storage medium 21 is implemented by these three ways, the checkpoint where the processor 12 executes the interface function isneeded to be set after the SEC phase, then the configuration file stored in the storage medium 21 may be read successfully.

In one embodiment, if the targeted register is related to the CPU or the hard disk, the processor 12 may execute the interface function in the PEI phase to configure the register. In another embodiment, if the targeted register is related to a chipset, a USB controller or a graphic processing unit, the processor 12 may execute the interface function in the DXE phase to configure the register.

In summary, the embodiments of the disclosure propose a computing device that may be interrupted to execute a specific interface function in one or more phases during the running process of the BIOS, and may access a configuration file stored in a storage medium through the interface function. Then, a specific hardware (e.g., MSR) is configured according to the configuration information within the configuration file. In this way, if it is needed to modify the configuration of certain hardware, there is no need to go through such processes as modifying, compiling and launching the UFEI BIOS, and the effect of reconfiguring the hardware may be achieved simply by editing the content of the configuration file. Accordingly, the related R&D mechanisms may be simplified (such as reducing the number of processes required for modifying hardware configuration) to improve work efficiency. In addition, flexibility of the UEFI BIOS is also improved, so that even after the BIOS is dispatched from the factory, the hardware configuration may still be modified during the running process of the BIOS, such as by using a patch.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A computing device, comprising:
    a storage medium, storing a configuration file, wherein the configuration file configures at least one specific type of hardware within the computing device; and
    a processor, coupled to the storage medium, wherein the processor is configured to:
        execute a basic input output system, and execute a first interface function to read and analyze the configuration file during a running process of the basic input output system; and
        configure a first register of a first specific type hardware within the computing device according to a result of the analyzing performed by the first interface function on the configuration file, wherein the running process of the basic input output system comprises a plurality of phases, and the processor is configured to:
            during executing a first phase among the plurality of phases, interrupt the first phase and execute the first interface function to read and analyze the configuration file;
            configure the first register of the first specific type hardware according to the result of the analyzing performed by the first interface function on the configuration file; and
            resume the first phase after completing configuring the first register.

2. The computing device of claim 1, wherein the processor is further configured to:
    execute a second interface function to read and analyze the configuration file during the running process of the basic input output system, and configure a second register of a second specific type hardware within the computing device according to a result of the analyzing performed by the second interface function on the configuration file.

3. The computing device of claim 1, wherein the configuration file comprises a data string, the data string is stored in a specific area in the storage medium and comprises a first configuration information of the first register, and the processor is configured to:
    execute the first interface function, and access the specific area via the first interface function to read the data string;
    analyze the data string to obtain the first configuration information; and
    configure the first register according to the first configuration information.

4. The computing device of claim 1, wherein the running process of the basic input output system comprises a plurality of configuration phases, the configuration file comprises a data string, and the data string comprises a first phase start tag, a first phase end tag, a first hardware type start tag, a first hardware type end tag, and a first configuration information corresponding to the first register, wherein the first phase start tag and the first phase end tag correspond to a first configuration phase among the plurality of configuration phases, the first hardware type start tag and the first hardware type end tag are recorded between the first phase start tag and the first phase end tag, and the first configuration information corresponding to the first register is recorded between the first hardware type start tag and the first hardware type end tag, wherein the result of the analyzing performed by the first interface function on the configuration file comprises the first phase start tag, the first phase end tag, the first hardware type start tag and the first hardware type end tag, and the processor configures the first register belonging to the first hardware type according to the first configuration information in the first configuration phase.

5. The computing device of claim 4, wherein the data string further comprises a second hardware type start tag, a second hardware type end tag, and a second configuration information corresponding to a second register, wherein the second hardware type start tag and the second hardware type end tag are recorded between the first hardware type end tag and the first phase end tag, and the second configuration information corresponding to the second register is recorded between the second hardware type start tag and the second hardware type end tag, wherein the result of the analyzing performed by the first interface function on the configuration file further comprises the second type start tag and the second type end tag, and the processor configures the second register belonging to the second hardware type according to the second configuration information in the first configuration phase.

6. The computing device of claim 4, wherein the data string further comprises a second phase start tag, a second phase end tag, a second hardware type start tag, a second hardware type end tag, and a second configuration information corresponding to a second register, wherein the second phase start tag and the second phase end tag correspond to a second configuration phase among the plurality of configuration phases, the second hardware type start tag and the second hardware type end tag are recorded between the second phase start tag and the second phase end tag, the second configuration information corresponding to the second register is recorded between the second hardware type start tag and the second hardware type end tag, and the processor further executes a second interface function to read and analyze the configuration file during the operating process and configures the second register according to a result of the analyzing performed by the second interface function on the configuration file, wherein the result of the analyzing performed by the second interface function on the configuration file comprises the second phase start tag, the second phase end tag, the second hardware type start tag and the second hardware type end tag, and the processor configures the second register belonging to the second hardware type according to the second configuration information in the second configuration phase.

7. The computing device of claim 1, wherein the storage medium is a NAND flash memory chip, a USB flash disk, a serial peripheral interface read-only memory, or a hard disk.

8. The computing device of claim 1, wherein the running process of the basic input output system comprises a security boot phase, a pre-extensible firmware interface initialization phase, a driver execution phase or a boot device selection phase.

9. The computing device of claim 8, wherein the processor executes the first interface function to read and analyze the configuration file after the security boot phase.

10. The computing device of claim 8, wherein if the first specific type hardware is a central processing unit or a hard disk of the computing device, the processor then executes the first interface function to read and analyze the configuration file in the pre-extensible firmware interface initialization phase.

11. The computing device of claim 8, wherein if the first specific type hardware is a chipset, a USB controller, or a graphic processing unit within the computing device, the processor then executes the first interface function to read and analyze the configuration file in the driver execution phase.

12. The computing device of claim 8, wherein the first interface function only corresponds to the pre-extensible firmware interface initialization phase, or only corresponds to the driver execution phase and the boot device selection phase.

13. The computing device of claim 1, wherein the processor further executes the first interface function to configure a microcode of a central processing unit of the computing device according to the result of the analyzing performed by the first interface function on the configuration file.

14. The computing device of claim 1, wherein the processor further executes the first interface function to configure an input/output space configuration of a chipset, a PCI configuration space setting or a memory setting within the computing device according to the result of the analyzing performed by the first interface function on the configuration file.

15. The computing device of claim 1, wherein the processor executes the basic input output system when the computing device is booted.

16. The computing device of claim 1, wherein the processor executes the basic input output system when the computing device resumes from an S3 state back to a normal state.

17. The computing device of claim 1, wherein the processor, besides configuring the first register of the first specific type hardware according to the result of the analyzing performed by the first interface function on the configuration file, further configuring a second register of the first specific type hardware according to the result of the analyzing performed by the first interface function on the configuration file.

18. The computing device of claim 1, wherein the first register is a model-specific register in the processor.

* * * * *